(12) United States Patent
Nakamoto et al.

(10) Patent No.: US 10,158,318 B2
(45) Date of Patent: Dec. 18, 2018

(54) CONTROL DEVICE FOR IN-VEHICLE ELECTRIC MOTOR

(71) Applicant: DENSO CORPORATION, Kariya, Aichi-pref. (JP)

(72) Inventors: Shinji Nakamoto, Kariya (JP); Koji Sakai, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/325,582

(22) PCT Filed: Aug. 3, 2015

(86) PCT No.: PCT/JP2015/003906
§ 371 (c)(1),
(2) Date: Jan. 11, 2017

(87) PCT Pub. No.: WO2016/027427
PCT Pub. Date: Feb. 25, 2016

(65) Prior Publication Data
US 2017/0163201 A1 Jun. 8, 2017

(30) Foreign Application Priority Data
Aug. 20, 2014 (JP) .................................. 2014-167830

(51) Int. Cl.
*H02P 8/36* (2006.01)
*H02P 29/024* (2016.01)
(Continued)

(52) U.S. Cl.
CPC ............ *H02P 29/024* (2013.01); *B60L 1/003* (2013.01); *H02J 7/0065* (2013.01); *H02P 21/02* (2013.01);
(Continued)

(58) Field of Classification Search
USPC ................. 318/130, 400.2, 400.21, 782, 490
See application file for complete search history.

(56) References Cited

U.S. PATENT DOCUMENTS

| 2004/0008530 A1* | 1/2004 | Kitahata | ............... H02M 5/458 363/131 |
| 2011/0210687 A1 | 9/2011 | Tsuji et al. | |

(Continued)

FOREIGN PATENT DOCUMENTS

| JP | S58218653 A | 12/1983 |
| JP | 2003230269 A * | 8/2003 |

(Continued)

*Primary Examiner* — Jorge L Carrasquillo
(74) *Attorney, Agent, or Firm* — Harness, Dickey & Pierce, P.L.C.

(57) ABSTRACT

In a control device controlling a drive circuit that drives an in-vehicle electric motor based on an output voltage of a DC power source, a capacitor for stabilizing the output voltage is disposed between the DC power source and the drive circuit, and a relay switch is disposed between the DC power source and the capacitor. The control device includes: an anomaly determining device that determines whether an anomaly occurs in a vehicle; and a discharge control device that controls the drive circuit to generate a torque at the electric motor based on an output voltage of the capacitor in a state where the relay switch disconnects between the DC power source and the capacitor when the anomaly determining device determines that the anomaly occurs in the vehicle.

12 Claims, 6 Drawing Sheets

(51) Int. Cl.
*H02P 23/00* (2016.01)
*B60L 1/00* (2006.01)
*H02P 27/06* (2006.01)
*H02J 7/00* (2006.01)
*H02P 21/02* (2006.01)
*H02P 21/22* (2016.01)
*H02P 29/032* (2016.01)

(52) U.S. Cl.
CPC .............. *H02P 21/22* (2016.02); *H02P 23/00* (2013.01); *H02P 27/06* (2013.01); *H02P 29/032* (2016.02)

(56) References Cited

U.S. PATENT DOCUMENTS

2013/0039107 A1* 2/2013 Fukuta .................... B60L 3/003
                                                      363/131
2015/0191087 A1    7/2015 Uchida

FOREIGN PATENT DOCUMENTS

| JP | 2003230269 A |   | 8/2003  |            |
|----|--------------|---|---------|------------|
| JP | 2010178595 A | * | 8/2010  | B60L 3/0069|
| JP | 2010178595 A |   | 8/2010  |            |
| JP | 2011002315 A |   | 1/2011  |            |
| JP | 2011200105 A |   | 10/2011 |            |
| JP | 2015130740 A |   | 7/2015  |            |

* cited by examiner

| POSITION OF ROTOR | S1 | S2 | S3 | S4 | S5 | S6 |
|---|---|---|---|---|---|---|
| $0 \leq \theta < \pi/3$ | ON | OFF | ON | OFF | OFF | ON |
| $\pi/3 \leq \theta < 2\pi/3$ | OFF | ON | ON | OFF | OFF | ON |
| $2\pi/3 \leq \theta < \pi$ | OFF | ON | ON | OFF | ON | OFF |
| $\pi \leq \theta < 4\pi/3$ | OFF | ON | OFF | ON | ON | OFF |
| $4\pi/3 \leq \theta < 5\pi/3$ | ON | OFF | OFF | ON | ON | OFF |
| $5\pi/3 \leq \theta < 2\pi$ | ON | OFF | OFF | ON | OFF | ON |

| POSITION OF ROTOR | S1 | S2 | S3 | S4 | S5 | S6 |
|---|---|---|---|---|---|---|
| $0 \leq \theta < \pi/3$ | ON | OFF | OFF | ON | OFF | ON |
| $\pi/3 \leq \theta < 2\pi/3$ | ON | OFF | ON | OFF | OFF | ON |
| $2\pi/3 \leq \theta < \pi$ | OFF | ON | ON | OFF | OFF | ON |
| $\pi \leq \theta < 4\pi/3$ | OFF | ON | ON | OFF | ON | OFF |
| $4\pi/3 \leq \theta < 5\pi/3$ | OFF | ON | OFF | ON | ON | OFF |
| $5\pi/3 \leq \theta < 2\pi$ | ON | OFF | OFF | ON | ON | OFF |

US 10,158,318 B2

CONTROL DEVICE FOR IN-VEHICLE ELECTRIC MOTOR

CROSS REFERENCE TO RELATED APPLICATIONS

This application is a U.S. National Phase Application under 35 U.S.C. 371 of International Application No. PCT/JP2015/003906 filed on Aug. 3, 2015 and published in Japanese as WO 2016/027427 A1 on Feb. 25, 2016. This application is based on and claims the benefit of priority from Japanese Patent Application No. 2014-167830 filed on Aug. 20, 2014. The entire disclosures of all of the above applications are incorporated herein by reference.

TECHNICAL FIELD

The present disclosure relates to a control device for an in-vehicle electric motor.

BACKGROUND ART

Some conventional types of control system for an electric motor for use in a vehicle include an inverter circuit and a capacitor. The inverter circuit outputs an alternating current to an electric motor on the basis of an output voltage from a DC voltage source. The capacitor stabilizes the output voltage from the DC voltage source to the inverter circuit (for example, see Patent Literature 1).

In such a control system, a discharge start angle storage, in response to a request to discharge the capacitor, stores a present rotation angle of the rotor as a start angle θ0 before the start of discharge control by energization of the motor. A command current determining circuit determines command currents idr and iqr with which the torque of the motor is expected to be zero. A command current corrector performs rotation correction of the phases of the command currents idr and iqr by an angular difference Δθ between the start angle θ0 and the present rotation angle θ. Feedback control is performed on the current of the motor such that the command currents idr and iqr have the corrected phases. This controls the motor so that the motor is inhibited from generating a torque in response to the request to discharge the capacitor.

PRIOR ART LITERATURES

Patent Literature

Patent Literature 1: JP-2011-200105 A

SUMMARY OF INVENTION

It is an object of the present disclosure to provide a control device for an in-vehicle electric motor, the control device causing a capacitor to discharge in a reduced period of time in response to occurrence of an abnormal vehicle condition.

According to an aspect of the present disclosure, in a control device for an in-vehicle electric motor controlling a drive circuit that drives the in-vehicle electric motor based on an output voltage of a DC power source, a capacitor for stabilizing the output voltage output from the DC power source to the drive circuit is disposed between the DC power source and the drive circuit, and a relay switch for connecting or disconnecting between the DC power source and the capacitor is disposed between the DC power source and the capacitor. The control device includes: an anomaly determining device that determines whether an anomaly occurs in a vehicle; and a discharge control device that controls the drive circuit to generate a torque at the electric motor based on an output voltage of the capacitor in a state where the relay switch disconnects between the DC power source and the capacitor when the anomaly determining device determines that the anomaly occurs in the vehicle.

The control device described above causes the electric motor to generate a torque when the anomaly determining unit determines that there is an anomaly of the vehicle, thereby allowing the charge of the capacitor to be consumed in abundance in a reduced period of time. Hence, the voltage between the electrodes of the capacitor can be lowered so as to be equal to or less than a predetermined voltage in a reduced period of time. Accordingly, the capacitor can be discharged in a reduced period of time when there is a vehicle abnormal condition.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

The present inventors have considered the use of the technique described in Patent Literature 1 for a control device that drives a motor for an in-vehicle electric compressor. The considered use is to enable the control device to cause a capacitor to discharge as described above in a state where the continuity between a DC voltage source and the capacitor is interrupted by a relay unit in the event of occurrence of an abnormal condition, such as a collision of a vehicle.

In the technique described in Patent Literature 1, the motor is controlled so as to be inhibited from generating a torque in response to a request to discharge the capacitor. Such control results in a situation in which the charge of the capacitor is consumed merely by switching loss of switching elements included in the inverter circuit and by generation of heat in a stator coil of the motor, thereby preventing the capacitor from discharging sufficient charge. Accordingly, a problem is generated that a long time is required from when the capacitor starts discharging in response to the occurrence of an abnormal vehicle condition until the voltage between the positive electrode and the negative electrode of the capacitor (hereinafter referred to as an interelectrode voltage) becomes equal to or less than a predetermined voltage.

The consideration by the inventors also shows that, in the case of the electric compressor, such a sudden stop of the motor may lead to reverse rotation of the motor due to the pressure of a refrigerant in the compressor, thereby causing the motor to generate electric power due to regeneration. In such a case, the electric power generated due to the regeneration charges the capacitor, which further prolongs the period of time in which the capacitor discharges so that the interelectrode voltage becomes equal to or less than the predetermined voltage. Thus, discharging a capacitor takes an extended period of time.

A control device, for use with an in-vehicle electric motor, that causes a capacitor to discharge in a reduced period of time in the event of occurrence of an abnormal vehicle condition will now be described.

First Embodiment

Figure 1:
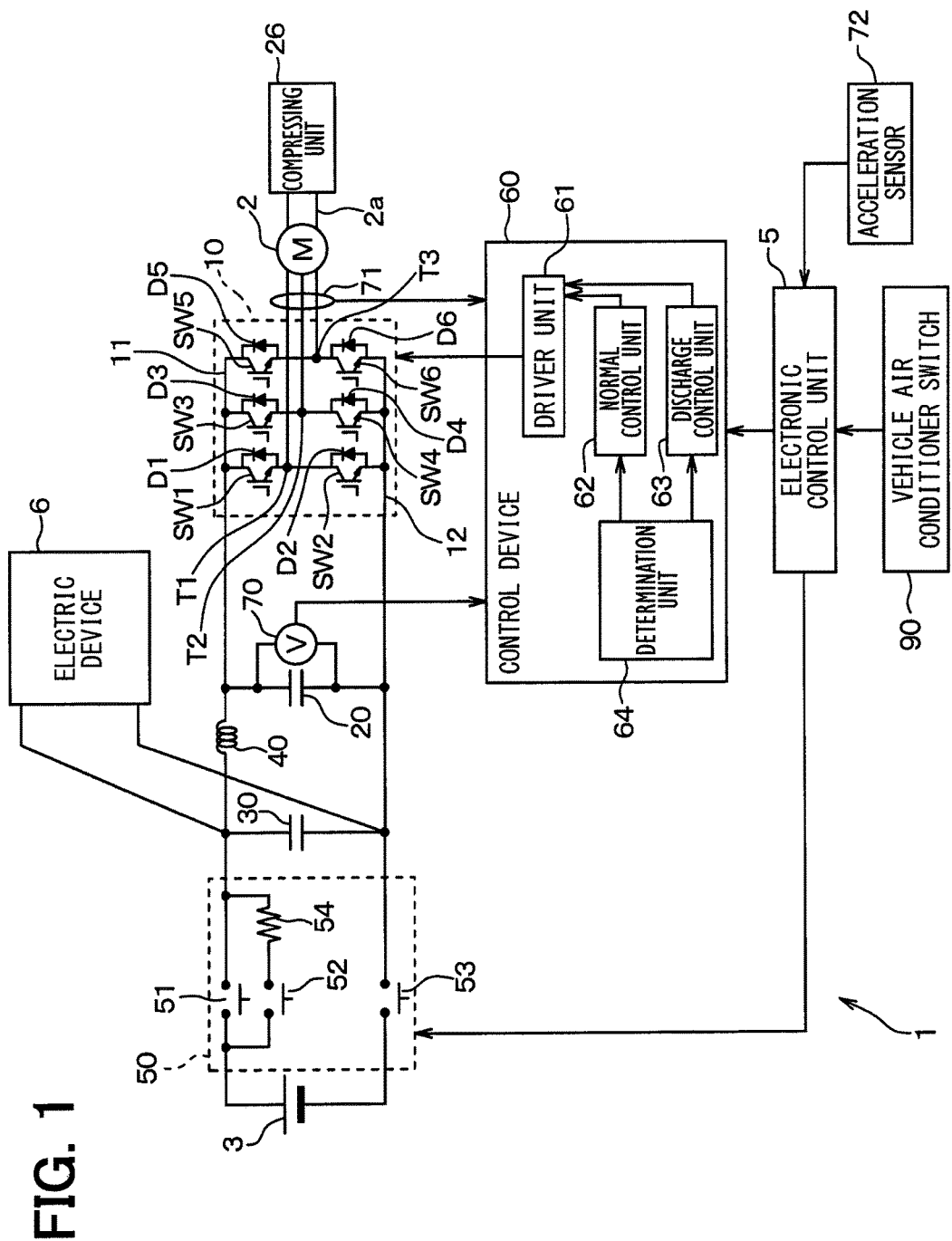
FIG. 1 is an electric circuit diagram of an overall electric configuration of an in-vehicle power conversion system according to a first embodiment of the present disclosure.

FIG. 1 is a diagram of an electric configuration of an in-vehicle power conversion system 1 according to a first embodiment of the present disclosure.

The in-vehicle power conversion system 1 is for driving a three-phase AC motor 2 on the basis of an output voltage of a high voltage power source 3. The three-phase AC motor 2 is coupled to a compressing mechanism 2b with a coupling shaft 2a. The high voltage power source 3 is a high voltage DC battery. It is a DC power source having an output voltage (for example, 300 V) that is higher than that of a low voltage power source (for example, 12 V). The low voltage power source supplies electric power to a control device 60 and an electronic control unit 5. The three-phase AC motor 2, the coupling shaft 2a, and the compressing mechanism 2b make up an electric compressor that compresses a refrigerant. The electric compressor is a major component of a refrigeration cycle unit for use in an in-vehicle air conditioner, in which a refrigerant is circulated. The three-phase AC motor 2 may be a synchronous AC motor.

Specifically, the in-vehicle power conversion system 1 includes, as illustrated in FIG. 1, an inverter circuit 10, a smoothing capacitors 20 and 30, an inductor 40, a relay unit 50, and the control device 60.

Figure 2:
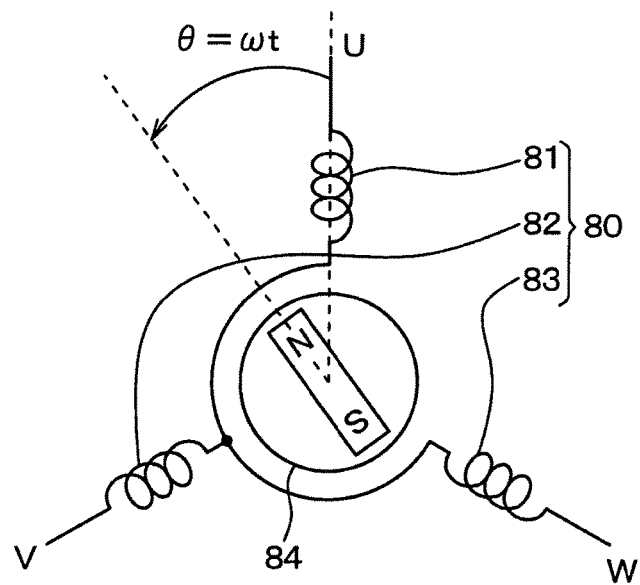
FIG. 2 is a diagram of a configuration of a three-phase AC motor in FIG. 1.

The inverter circuit 10 is a drive circuit that outputs a three-phase alternating current to a stator coil 80 of the three-phase AC motor 2 (see FIG. 2) on the basis of the output voltage of the high voltage power source 3. The stator coil 80 of the present embodiment may include a U-phase coil 81, a V-phase coil 82, and a W-phase coil 83 that are star connected as illustrated in FIG. 2.

The inverter circuit 10 is a well-known type of circuit and includes transistors SW1, SW2, SW3, SW4, SW5, and SW6 and freewheeling diodes D1, D2, D3, D4, D5, and D6. The transistors SW1, SW3, and SW5 are connected to a positive bus 11. The positive bus 11 is connected to the high voltage power source 3 at a positive electrode thereof. The transistors SW2, SW4, and SW6 are connected to a negative bus 12. The negative bus 12 is connected to the high voltage power source 3 at a negative electrode thereof. The positive bus 11 and the negative bus 12 constitute two power input electrodes of the inverter circuit 10.

The transistors SW1 and SW2 are connected in series between the positive bus 11 and the negative bus 12. The transistors SW3 and SW4 are connected in series between the positive bus 11 and the negative bus 12. The transistors SW5 and SW6 are connected in series between the positive bus 11 and the negative bus 12.

A common connecting terminal T1, which is disposed between the transistors SW1 and SW2, is connected to the U-phase coil 81 of the stator coil 80 of the three-phase AC motor 2. A common connecting terminal T2, which is disposed between the transistors SW3 and SW4, is connected to the V-phase coil 82 of the stator coil 80 of the three-phase AC motor 2. A common connecting terminal T3, which is disposed between the transistors SW5 and SW6, is connected to the W-phase coil 83 of the stator coil 80 of the three-phase AC motor 2.

The transistors SW1, SW2, SW3, SW4, SW5, and SW6 may be each a semiconductor switching element, such as an IGBT (Insulated Gate Bipolar Transistor).

The smoothing capacitor 20 is disposed between the inverter circuit 10 and the high voltage power source 3. The smoothing capacitor 20 is disposed between the positive bus 11 and the negative bus 12 of the inverter circuit 10 and connected thereto, and stabilizes the voltage provided between the positive bus 11 and the negative bus 12 by the high voltage power source 3. In other words, the smoothing capacitor 20 stabilizes the voltage output from the high voltage power source 3 to the inverter circuit 10.

The smoothing capacitor 30 is disposed between the positive electrode and the negative electrode of the high voltage power source 3 and connected in parallel with the smoothing capacitor 20. The smoothing capacitor 30 is disposed closer to the high voltage power source 3 than the inverter circuit 10 and the smoothing capacitor 20 are to the high voltage power source 3. The smoothing capacitor 30 stabilizes the voltage output from the high voltage power source 3 to two power input electrodes of the electric device 6.

The electric device 6 constitutes, for example, a drive circuit for a traction motor. The drive circuit for a traction motor includes a DC/DC converter circuit that increases (or decreases) an input voltage and outputs a resulting voltage and an inverter circuit that drives the traction motor.

The inductor 40 is a normal coil disposed between a positive electrode of the smoothing capacitor 20 and a positive electrode of the smoothing capacitor 30. The inductor 40 inhibits a ripple current from flowing from the side on which the smoothing capacitor 30 is disposed to the side on which the smoothing capacitor 20 is disposed.

The relay unit 50 is disposed between the high voltage power source 3 and the smoothing capacitors 20 and 30. The relay unit 50 is disposed closer to the high voltage power source 3 than the inverter circuit 10, the smoothing capacitors 20 and 30, and the inductor 40 are to the high voltage power source 3. The relay unit 50 interrupts or achieves continuity from the high voltage power source 3 to the inverter circuit 10 and the smoothing capacitors 20 and 30.

Specifically, the relay unit 50 includes relays 51, 52, and 53 and a resistive element 54. The relays 51 and 52 are relay switches disposed in parallel with each other between the positive electrode of the high voltage power source 3 and the positive electrode of the smoothing capacitor 30. The relay 53 is a relay switch disposed between the negative electrode of the high voltage power source and a negative electrode of the smoothing capacitor 30. The relays 51, 52, and 53 are controlled by the electronic control unit 5.

The resistive element 54 is disposed between the positive electrode of the high voltage power source 3 and the positive electrode of the smoothing capacitor 30 and connected in series with the relay 52. The resistive element 54 prevents a rush current from flowing from the high voltage power source 3 through the smoothing capacitors 20 and 30 when the positive electrode of the high voltage power source 3 is connected to the positive electrode of the smoothing capacitor 30 by the relay 52.

The control device 60, which includes a microcomputer and a memory, performs inverter control processing to control the inverter circuit 10 on the basis of a value detected by a voltage sensor 70, a value detected by a current sensor 71, and a control signal input from the electronic control unit 5.

The voltage sensor 70 detects a voltage between the positive electrode and a negative electrode of the smoothing capacitor 20. The current sensor 71 detects a three-phase alternating current output from the inverter circuit 10 to the stator coil 80 of the three-phase AC motor 2.

The control signal input from the electronic control unit 5 includes a collision flag, a command value, and a start command.

The collision flag indicates the result of determination by the electronic control unit 5 as to whether there is a collision of a vehicle in accordance with a value detected by an acceleration sensor 72. The acceleration sensor 72 detects the acceleration of the vehicle. The electronic control unit 5 repeatedly determines whether there is a collision of the vehicle in accordance with a value detected by the acceleration sensor 72.

Specifically, the electronic control unit 5 determines that there is a collision of the vehicle if a value detected by the acceleration sensor 72 is equal to or greater than a predetermined value, and outputs to the control device 60 a collision flag indicative of the result of the determination that there is a collision of the vehicle. The electronic control unit 5 determines that there is no collision of the vehicle if a value detected by the acceleration sensor 72 is less than the predetermined value, and outputs to the control device 60 a collision flag indicative of the result of the determination that there is no collision of the vehicle.

The command value is information that indicates a target value for the number of revolutions of the three-phase AC motor 2. The start command is a signal that indicates that a vehicle air conditioner switch 90 is turned on. The vehicle air conditioner switch 90 is turned on by a user to start a vehicle air conditioner.

The control device 60 according to the present embodiment includes a driver unit 61, a normal control unit 62, a discharge control unit 63, and a determination unit 64.

The inverter control processing of the control device 60 according to the present embodiment will now be described.

Figure 3:
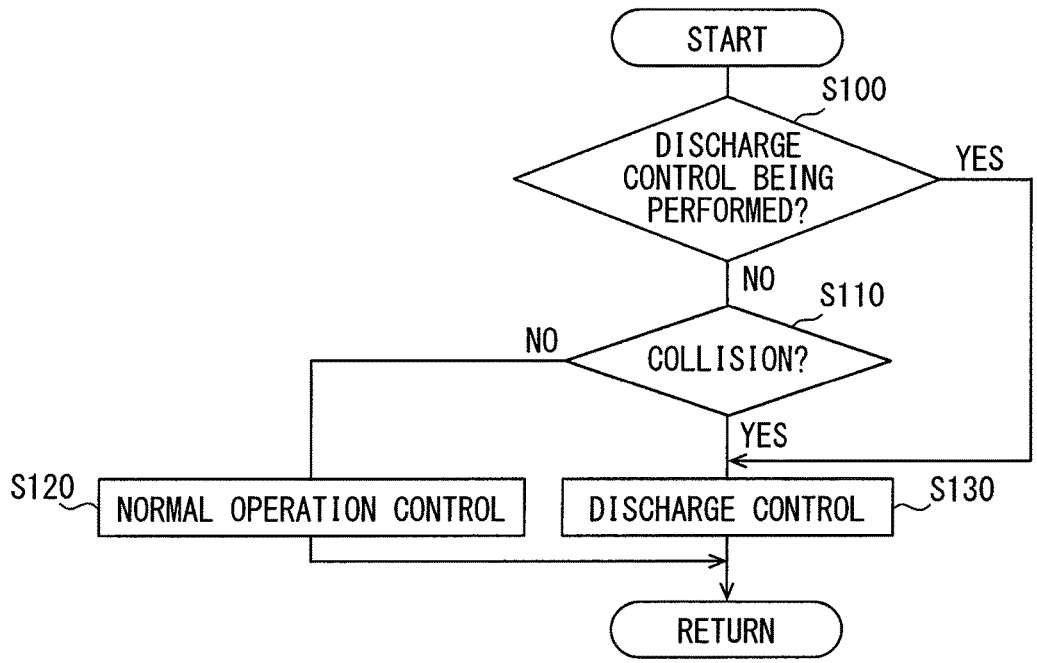
FIG. 3 is a flowchart of inverter control processing of a control device in FIG. 1.

The control device 60 executes a computer program in accordance with the flowchart in FIG. 3. FIG. 3 is a flowchart of the inverter control processing. The inverter control processing is to cause the smoothing capacitor 20 to discharge its charge in the event of a collision or the like of a vehicle. The present embodiment assumes that the in-vehicle power conversion system 1 works normally after a collision of the vehicle. The control device 60 starts performing the inverter control processing upon receipt of a start signal from the electronic control unit 5. When the vehicle air conditioner switch 90 is turned on, the start signal is output by the vehicle air conditioner switch 90 and transmitted through the electronic control unit 5 to the control device 60.

In step 100, it is determined whether discharge control is being performed. The discharge control is to cause the capacitor 20 to discharge its charge, as described hereinafter. If the discharge control is not being performed, No is selected.

Then, it is determined in step 110 whether there is a collision of a vehicle on the basis of a collision flag received from the electronic control unit 5. If the collision flag received from the electronic control unit 5 indicates no collision of the vehicle, it is determined that there is no collision of the vehicle and No is selected.

Then, in step 120, normal operation control is performed. Specifically, the inverter circuit 10 is controlled such that the actual number of revolutions of the three-phase AC motor 2 approaches a command value input from the electronic control unit 5. This causes a three-phase alternating current to flow via the common connecting terminals T1, T2, and T3 of the inverter circuit 10 through the stator coil 80. As a result, the stator coil 80 generates a rotating magnetic field. A rotor 84 is rotated in synchronization with the rotating magnetic field. In this manner, the actual number of revolutions of the rotor 84 approaches the command value input from the electronic control unit 5.

Then, the flowchart reverts to step 100. If it is determined in step 100 that the discharge control is not being performed, No is selected. Then, if it is determined in step 110 that there is no collision of the vehicle on the basis of a collision flag received from the electronic control unit 5, No is selected. Then, in step 120, the normal operation control is performed. As a result, the selection of No in step 100, the selection of No in step 110, and the normal operation control (in step 120) are repeated unless there is a collision of the vehicle. This operation enables the number of revolutions of the three-phase AC motor 2 to track the command value input from the electronic control unit 5. The procedure thereby enables the three-phase AC motor 2 to drive the compressing mechanism 2b so that the compressing mechanism 2b sucks and compresses a refrigerant and discharges the resultant refrigerant. That is, the refrigeration cycle unit for use in an in-vehicle air conditioner can be operated.

Subsequently, if a collision of the vehicle occurs, a value detected by the acceleration sensor 72 becomes equal to or greater than the predetermined value. Then, the electronic control unit 5 determines that there is a collision of the vehicle on the basis of the value detected by the acceleration sensor 72 and controls the relays 51, 52, and 53 of the relay unit 50 so as to interrupt the continuity between the high voltage power source 3 and the smoothing capacitors 20 and 30. The electronic control unit 5 also outputs to the control device 60 a collision flag that indicates the result of the determination that there is a collision of the vehicle.

Then, the control device 60 determines that there is a collision of the vehicle on the basis of the collision flag received from the electronic control unit 5 and selects Yes in step 110. Then, in step 130, discharge control processing for the capacitor 20 is performed.

Then, the flowchart reverts to step 100, where it is determined that the discharge control processing for the capacitor 20 is being performed, and Yes is selected. This causes the flowchart to proceed to step 130 (the discharge control processing). As a result, the selection of Yes in step 100 and step 130 (the discharge control processing) are repeated in a state where the continuity between the high voltage power source 3 and the smoothing capacitors 20 and 30 is interrupted by the relay unit 50.

Figure 4:
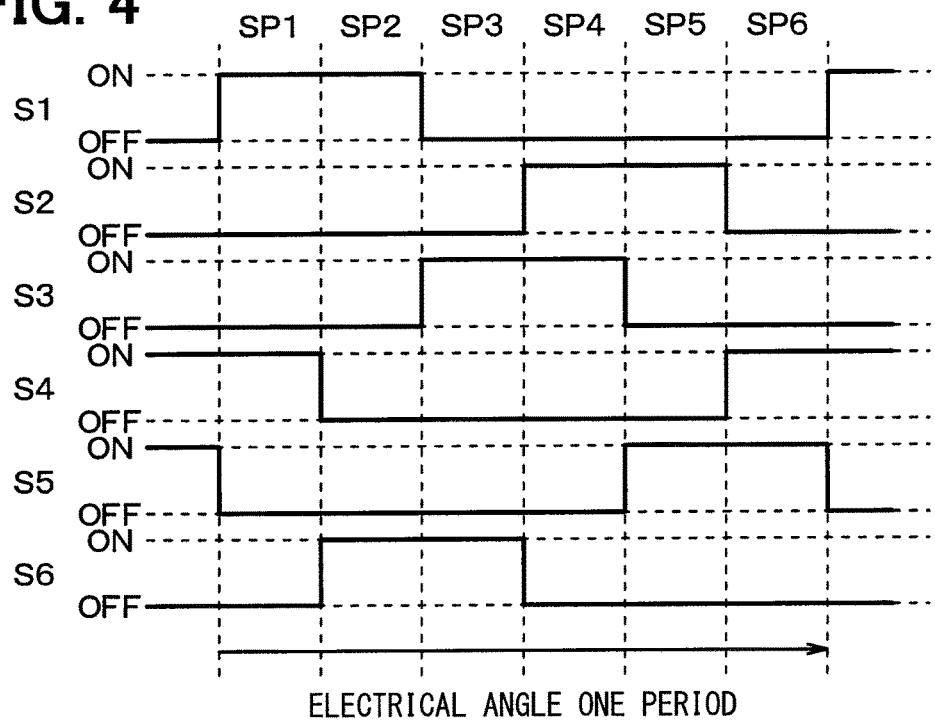
FIG. 4 is a diagram of switching patterns of transistors of an inverter circuit in FIG. 1.

The discharge control processing according to the present embodiment will now be described in detail with reference to FIG. 4. FIG. 4 is a diagram of switching patterns of the transistors SW1 to SW6 of the inverter circuit 10. The switching patterns are of 120-degree energization control.

In the discharge control processing, the control device 60 controls the transistors SW1 to SW6 of the inverter circuit 10 such that the stator coil 80 generates a rotating magnetic field of a predetermined number of revolutions.

For example, the transistors SW1 to SW6 are controlled so that switching patterns SP1, SP2, SP3, SP4, SP5, SP6, and SP1 in FIG. 4 are executed in the order set forth.

In the switching pattern SP1, the transistors SW1 and SW4 are turned on, and the transistors SW2, SW3, SW5, and SW6 are turned off. In the switching pattern SP2, the transistors SW1 and SW6 are turned on, and the transistors SW2, SW3, SW4, and SW5 are turned off. In the switching pattern SP3, the transistors SW3 and SW6 are turned on, and the transistors SW1, SW2, SW4, and SW5 are turned off. In the switching pattern SP4, the transistors SW2 and SW3 are turned on, and the transistors SW1, SW4, SW5, and SW6 are turned off. In the switching pattern SP5, the transistors SW2 and SW5 are turned on, and the transistors SW1, SW3, SW4, and SW6 are turned off. In the switching pattern SP6, the transistors SW4 and SW5 are turned on, and the transistors SW1, SW2, SW3, and SW6 are turned off.

Such switching of the transistors SW1 to SW6 causes a three-phase alternating current to be output to the stator coil 80 through the common connecting terminals T1, T2, and T3 on the basis of the charge accumulated in the smoothing capacitor 20. The stator coil 80 thus generates a rotating magnetic field of the predetermined number of revolutions. The rotating magnetic field enables the three-phase AC motor 2 to generate a torque that rotates the rotor 84 with the predetermined number of revolutions. The capacitor 20 can discharge its accumulated charge in this manner.

In the present embodiment described above, the control device 60 is used in the in-vehicle power conversion system 1. In the in-vehicle power conversion system 1, the inverter circuit 10, which drives the three-phase AC motor 2 on the basis of the output voltage of the smoothing capacitor 20, is controlled. The smoothing capacitor 20 stabilizes the output voltage of the high voltage power source 3. The relay unit 50, which is disposed between the high voltage power source 3 and the smoothing capacitor 20, achieves or interrupts the continuity between the high voltage power source 3 and the smoothing capacitor 20. If the control device 60 determines that there is a collision of a vehicle and thus selects YES in step 110, the control device 60 controls the inverter circuit 10 such that the three-phase AC motor 2 generates a torque on the basis of the output voltage of the smoothing capacitor 20 in a state where the continuity between the high voltage power source 3 and the smoothing capacitor 20 is interrupted by the relay unit 50.

The operation described above enables the three-phase AC motor 2 to generate a torque in the event of a collision of a vehicle, and thus, the charge of the smoothing capacitor 20 is consumed by such generation of a torque in addition to the switching loss of the transistors SW1 to SW6 and generation of heat by the stator coil 80. The charge of the smoothing capacitor 20 can be consumed in abundance in a reduced period of time in this manner. Accordingly, the voltage between the positive electrode and the negative electrode of the smoothing capacitor 20 can be lowered so as to be equal to or less than a predetermined voltage that satisfies a collision safety regulation in a reduced period of time in the event of a collision of the vehicle. Hence, the smoothing capacitor 20 can be discharged in a reduced period of time in the event of a collision of a vehicle. Accordingly, the smoothing capacitor 20 can be discharged swiftly in the event of a collision of the vehicle.

Figure 5:
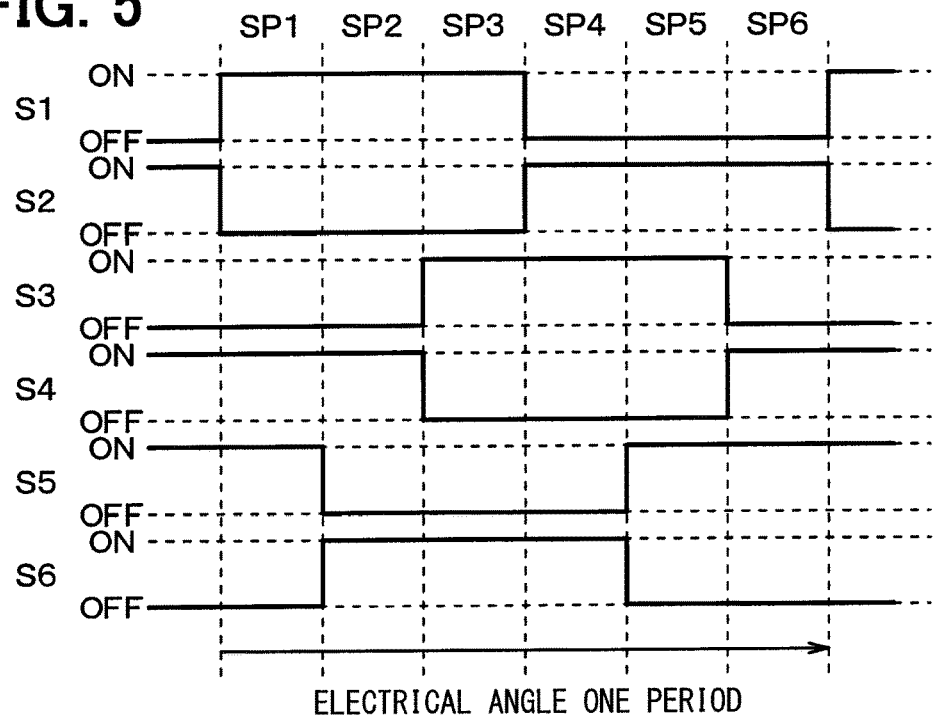
FIG. 5 is a diagram of switching patterns of the transistors of the inverter circuit in a modification of the first embodiment.

In the first embodiment, the switching patterns of the 120-degree energization control are used in the discharge control processing to cause the stator coil 80 to generate a rotating magnetic field, although this example is not a limitation. Other switching patterns may be used to cause the stator coil 80 to generate a rotating magnetic field. For example, switching patterns of 180-degree energization control may be used in the discharge control processing. FIG. 5 is a diagram of switching patterns of the 180-degree energization control.

For example, the transistors SW1 to SW6 are controlled so that switching patterns SP1, SP2, SP3, SP4, SP5, SP6, and SP1 in FIG. 5 are executed in the order set forth.

In the switching pattern SP1, the transistors SW1, SW4, and SW5 are turned on, and the transistors SW2, SW3, and SW6 are turned off. In the switching pattern SP2, the transistors SW1, SW4, and SW6 are turned on, and the transistors SW2, SW3, and SW5 are turned off. In the switching pattern SP3, the transistors SW1, SW3, and SW6 are turned on, and the transistors SW2, SW4, and SW5 are turned off. In the switching pattern SP4, the transistors SW2, SW3, and SW6 are turned on, and the transistors SW1, SW4, and SW5 are turned off. In the switching pattern SP5, the transistors SW2, SW3, and SW5 are turned on, and the transistors SW1, SW4, and SW6 are turned off. In the switching pattern SP6, the transistors SW2, SW4, and SW5 are turned on, and the transistors SW1, SW3, and SW6 are turned off.

Second Embodiment

In an example described in the first embodiment, the stator coil 80 is caused to generate a rotating magnetic field of a predetermined number of revolutions in the discharge control processing. In another example to be described in a second embodiment, a torque is generated in accordance with the position of a rotor 84 in the discharge control processing.

An in-vehicle power conversion system 1 according to the present embodiment and the in-vehicle power conversion system 1 according to the first embodiment are different from each other in the inverter control processing of the control device 60. Inverter control processing of a control device 60 according to the present embodiment will now be described.

Figures 6, 7:
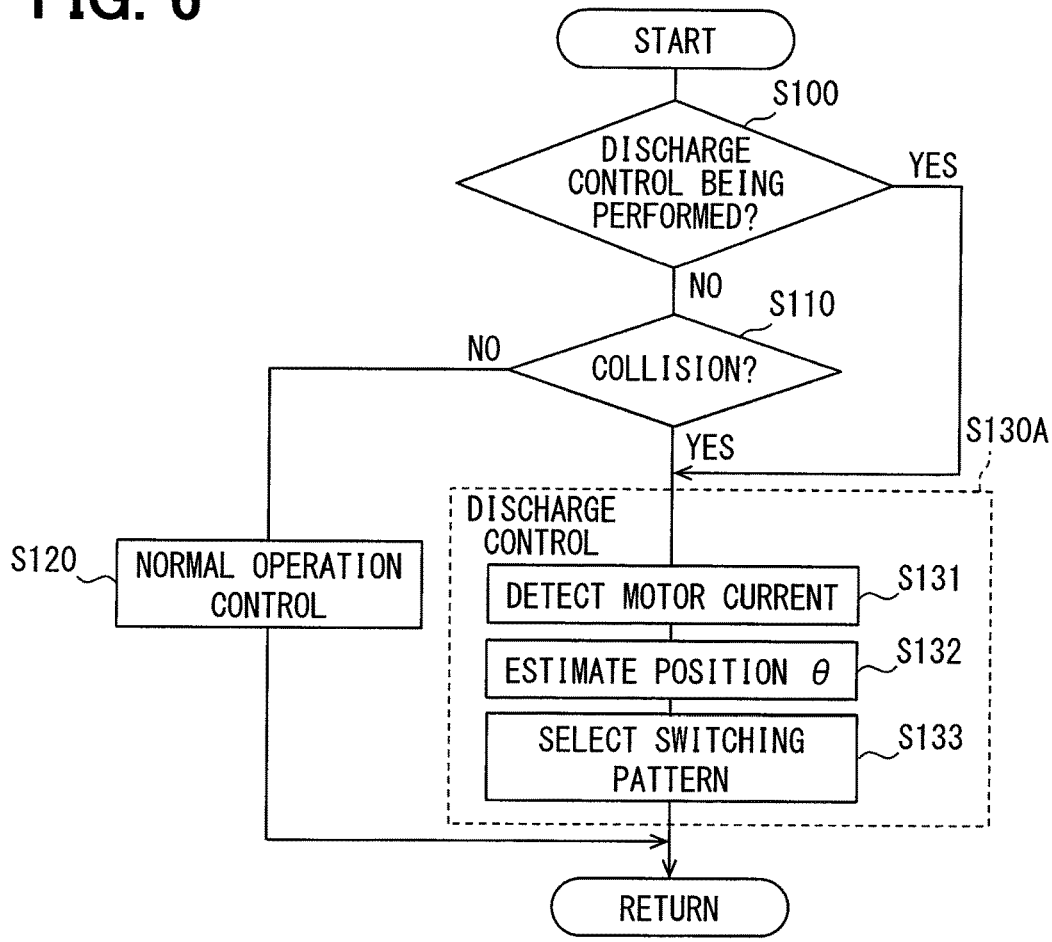
FIG. 6 is a flowchart of inverter control processing of a control device according to a second embodiment of the present disclosure.
FIG. 7 is a diagram of switching patterns of transistors for use in inverter control processing in the second embodiment.

The control device 60 performs the inverter control processing in accordance with the flowchart in FIG. 6 instead of that in FIG. 3.

In the flowchart in FIG. 6, step 130 in FIG. 3 is replaced by step 130A. Steps 100, 110, and 120, except step 130A, in the flowchart of FIG. 6 are identical with steps 100, 110, and 120 in FIG. 3.

Step 130A in FIG. 6 includes steps 131, 132, and 133.

In step 131, a current sensor 71 detects a three-phase alternating current I output from an inverter circuit 10 to a stator coil 80 of a three-phase AC motor 2. The detected three-phase alternating current I is used to estimate the position of the rotor 84 (step 132).

With a reference position (i.e., at an angle of zero degrees) being the position of a U-phase coil 81, the angle of the rotor 84 being $\theta$ with respect to the reference position, and a magnetic field generated by a permanent magnet embedded in the rotor 84 being φ, an expression 1 below is satisfied.

$$\phi = \Phi \cos\theta \quad \text{[Expression 1]}$$

Here, Φ is a factor indicating the magnitude of the magnetic field generated by the permanent magnet embedded in the rotor 84.

With the voltage generated in the stator coil 80 being v, and the angular velocity of the rotor 84 being ω, an expression 2 below is satisfied.

$$v = \frac{d\phi}{dt}$$
$$= -\omega \times \Phi \sin\theta \quad \text{[Expression 2]}$$

With the inductance of the stator coil 80 being L, the three-phase alternating current I and the voltage v satisfy an expression 3 below.

$$I = 1/L \cdot \int v \, dt \quad \text{[Expression 3]}$$

By substitution of the expression 2 into the expression 3, an expression 4 below is satisfied.

$$I = \phi/L \, \sin(\theta - \pi/2) \quad \text{[Expression 4]}$$

The angle θ of the rotor 84, that is, the position of the rotor 84, thus can be estimated on the basis of the factor Φ, the inductance L, and the three-phase alternating current I. The position of the rotor 84 estimated in the manner described above will be referred to as an estimated position of the rotor 84 hereinafter.

Then, in step 133, the stator coil 80 is caused to generate a magnetic field that is for rotating the rotor 84 in a normal direction by a predetermined angle (for example, π/3) from the estimated position of the rotor 84.

Specifically, a switching pattern corresponding to the estimated position of the rotor 84 obtained in step 132 described above is selected from a diagram in FIG. 7. FIG. 7 is a diagram of switching patterns, each of which corresponds to a position of the rotor 84, for causing the stator coil 80 to generate a magnetic field that is for rotating the rotor 84 by (π/3) degrees in the normal direction.

In the case of 0≤θ<π/3, transistors S1, S3, and S6 are turned on, and transistors S2, S4, and S5 are turned off. In the case of π/3≤θ<2π/3, the transistors S2, S3, and S6 are turned on, and the transistors S1, S4, and S5 are turned off. In the case of 2π/3≤θ<π, the transistors S2, S3, and S5 are turned on, and the transistors S1, S4, and S6 are turned off. In the case of π≤θ<4π/3, the transistors S2, S4, and S5 are turned on, and the transistors S1, S3, and S6 are turned off. In the case of 4π/3≤θ<5π/3, the transistors S1, S4, and S5 are turned on, and the transistors S2, S3, and S6 are turned off. In the case of 5π/3≤θ<2π, the transistors S1, S4, and S6 are turned on, and the transistors S2, S3, and S5 are turned off.

The transistors S1 to S6 of the inverter circuit 10 are controlled so that one of the switching patterns that corresponds to the estimated position of the rotor 84 is executed. This causes a three-phase alternating current to be output to the stator coil 80 through common connecting terminals T1, T2, and T3 on the basis of the charge accumulated in a smoothing capacitor 20. The stator coil 80 thus generates a magnetic field. This magnetic field enables the rotor 84 to rotate in the normal direction by (π/3) degrees. The smoothing capacitor 20 can discharge its accumulated charge in this manner.

The switching patterns in FIG. 7 are stored in a memory in advance as data for executing a computer program. In the present embodiment, the normal direction is the direction in which the rotor 84 of the three-phase AC motor 2 is rotated in the normal operation control (step 120).

In the present embodiment described above, if the control device 60 determines that there is a collision of a vehicle and thus selects Yes in step 110, the control device 60 estimates the position of the rotor 84 and controls the inverter circuit 10 such that a switching pattern corresponding to the estimated position is executed in a state where the continuity between a high voltage power source 3 and the smoothing capacitor 20 is interrupted by a relay unit 50 (step 130A). This causes the stator coil 80 to generate a magnetic field that produces a torque that rotates the rotor 84 in the normal direction by a predetermined angle (π/3 degrees) from the estimated position of the rotor 84.

The operation described above enables generation of a torque that rotates the rotor 84 in the normal direction by a predetermined angle in the event of a collision of a vehicle and thereby allows the charge of the smoothing capacitor 20 to be consumed in abundance in a reduced period of time. Accordingly, as is the case with the first embodiment described above, the voltage between the positive electrode and the negative electrode of the smoothing capacitor 20 can be lowered so as to be equal to or less than a predetermined voltage that satisfies a collision safety regulation in a reduced period of time in the event of a collision of the vehicle. Hence, the smoothing capacitor 20 can be discharged in a reduced period of time in the event of a collision of a vehicle.

In the second embodiment, the switching patterns in FIG. 7 are used in the discharge control processing for the smoothing capacitor 20 to cause the stator coil 80 to generate a magnetic field, although this example is not a limitation. Other switching patterns may be used to cause the stator coil 80 to generate a magnetic field.

For example, the rotor 84 may be rotated in a reverse direction by a predetermined angle in the discharge control processing for the smoothing capacitor 20. The reverse direction is the direction opposite to the direction in which the rotor 84 of the three-phase AC motor 2 is rotated in the normal operation control (step 120).

Figures 8, 9:
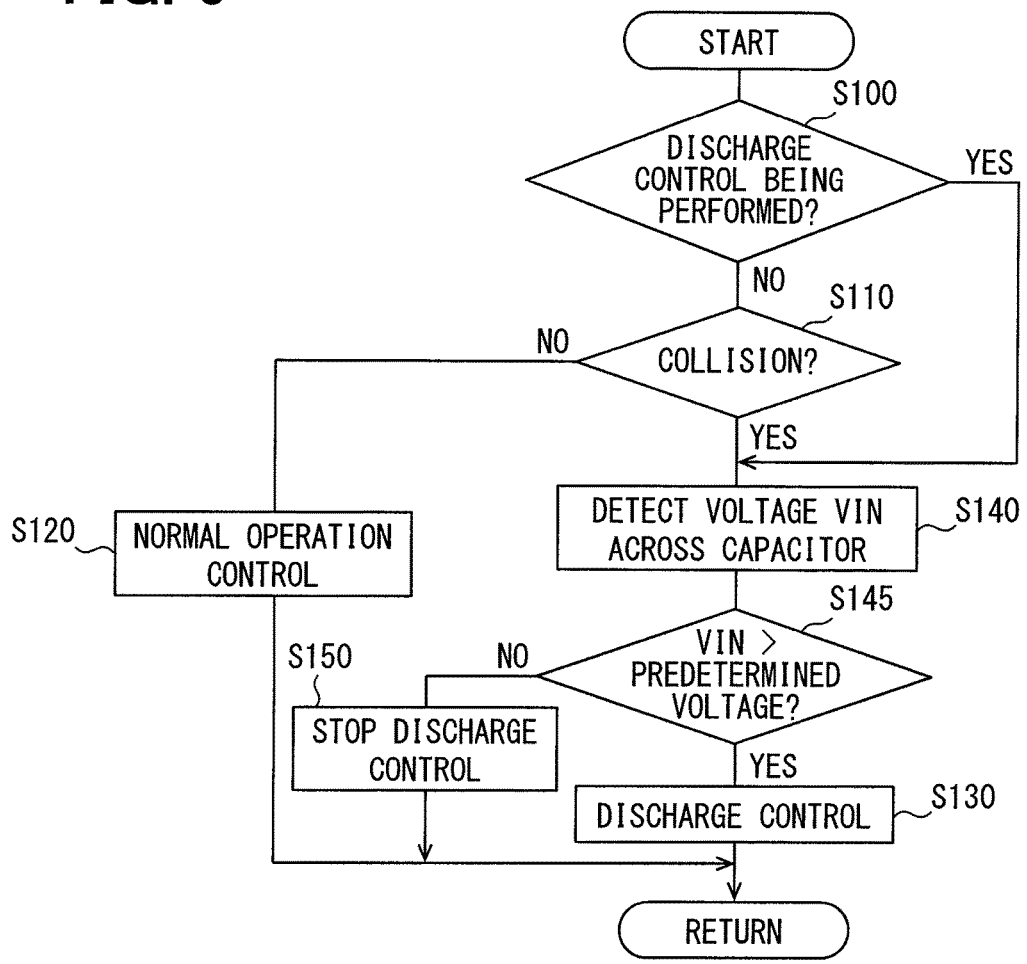
FIG. 8 is a diagram of switching patterns of transistors for use in inverter control processing in a modification of the second embodiment.
FIG. 9 is a flowchart of inverter control processing of a control device according to a third embodiment of the present disclosure.

FIG. 8 is a diagram of exemplary switching patterns each of which causes a torque of the reverse direction to be applied to the rotor 84 in accordance with the estimated position of the rotor 84.

With the position of the U phase being at zero degrees and the angle of the rotor 84 being θ, in the case of 0≤θ<π/3, the transistors S1, S4, and S6 are turned on, and the transistors S2, S3, and S5 are turned off. In the case of π/3≤θ<2π/3, the transistors S1, S3, and S6 are turned on, and the transistors S2, S4, and S5 are turned off. In the case of 2π/3≤θ<π, the transistors S2, S3, and S6 are turned on, and the transistors S1, S4, and S5 are turned off. In the case of π≤θ<4π/3, the transistors S2, S3, and S5 are turned on, and the transistors S1, S4, and S6 are turned off. In the case of 4π/3≤θ<5π/3, the transistors S2, S4, and S5 are turned on, and the transistors S1, S3, and S6 are turned off. In the case of 5π/3≤θ<2π, the transistors S1, S4, and S5 are turned on, and the transistors S2, S3, and S6 are turned off.

The transistors S1 to S6 of the inverter circuit 10 are controlled so that one of the switching patterns that corresponds to the estimated position of the rotor 84 is executed. This causes a three-phase alternating current to be output to the stator coil 80 through the common connecting terminals T1, T2, and T3 on the basis of the charge accumulated in the smoothing capacitor 20. The stator coil 80 thus generates a magnetic field. This magnetic field enables the rotor 84 to rotate in the reverse direction by ($\pi/3$) degrees. The smoothing capacitor 20 can discharge its accumulated charge in this manner.

In the second embodiment, the position of the rotor 84 is estimated on the basis of a three-phase alternating current I output from the inverter circuit 10 to the stator coil 80, although this example is not a limitation. Instead of estimating the position of the rotor 84, the position may be identified using previously-mapped information based on variation of the three-phase alternating current I before the application of a voltage to generate a torque. Alternatively, the position of the rotor 84 may be estimated by a method that does not use the three-phase alternating current I before the application of a voltage to generate a torque.

In the second embodiment, the rotor 84 is rotated by a predetermined angle of ($\pi/3$) degrees to discharge the charge of the smoothing capacitor 20, although this example is not a limitation. The predetermined angle by which the rotor 84 is rotated may be an angle other than ($\pi/3$) degrees. This applies to the modification illustrated in FIG. 8.

Third Embodiment

In an example to be described in a third embodiment, the discharge control processing for a smoothing capacitor 20 is performed if it is determined that there is a collision of a vehicle as in the first embodiment and that the voltage between a positive electrode and a negative electrode of the smoothing capacitor 20 is equal to or greater than a predetermined voltage.

An in-vehicle power conversion system 1 according to the present embodiment and the in-vehicle power conversion system 1 according to the first embodiment are different from each other in the inverter control processing of the control device 60. Inverter control processing of a control device 60 according to the present embodiment will now be described.

The control device 60 performs the inverter control processing in accordance with the flowchart in FIG. 9 instead of that in FIG. 3. The flowchart in FIG. 9 includes steps 140, 145, and 150 in addition to those of the flowchart in FIG. 3.

In step 100, if it is determined that the discharge control is not being performed, No is selected. Then, if it is determined in step 110 that there is a collision of a vehicle, Yes is selected. Then, in step 140, a voltage sensor 70 detects the voltage between the positive electrode and the negative electrode of the smoothing capacitor 20.

Then, it is determined in step 145 whether the voltage between the positive electrode and the negative electrode of the smoothing capacitor 20 (hereinafter referred to as an interelectrode voltage Vin) is equal to or greater than a predetermined voltage on the basis of the value detected by the voltage sensor 70. In the present embodiment, the predetermined voltage is, for example, 60 volts.

Here, if the interelectrode voltage Vin of the smoothing capacitor 20 is equal to or greater than the predetermined voltage, Yes is selected in step 145 and the flowchart proceeds to step 130 in which the discharge control processing is performed. Then, the flowchart reverts to step 100. As a result, the selection of Yes in step 100, step 140 (processing to detect the interelectrode voltage Vin), the selection of Yes in step 145, and step 130 (the discharge control processing) are repeated as long as the interelectrode voltage Vin of the smoothing capacitor 20 is equal to or greater than the predetermined voltage. This operation enables the smoothing capacitor 20 to discharge its charge continuously.

Subsequently, if the interelectrode voltage Vin of the smoothing capacitor 20 becomes less than the predetermined voltage, No is selected in step 145. Then, an inverter circuit 10 is controlled such that the discharge control processing for the smoothing capacitor 20 is stopped. That is, if No is selected in step 145, the transistors SW1, SW2, SW3, SW4, SW5, and SW6 are turned off. This allows the discharge control processing for the smoothing capacitor 20 to be stopped if the interelectrode voltage Vin of the smoothing capacitor 20 is less than the predetermined voltage.

In the present embodiment described above, the control device 60 causes a three-phase AC motor 2 to generate a torque if there is a collision of a vehicle and if the interelectrode voltage Vin of the smoothing capacitor 20 is equal to or greater than a predetermined voltage, thereby allowing the charge of the smoothing capacitor 20 to be consumed in abundance in a reduced period of time. Accordingly, the voltage between the positive electrode and the negative electrode of the smoothing capacitor 20 can be lowered so as to be equal to or less than a predetermined voltage that satisfies a collision safety regulation in a reduced period of time in the event of a collision of the vehicle. Hence, the smoothing capacitor 20 can be discharged in a reduced period of time in the event of a collision of a vehicle.

Fourth Embodiment

In the first to third embodiments, when the relay unit 50 interrupts the continuity between the smoothing capacitor 20 and the high voltage power source 3 such that supply of the output voltage of the high voltage power source 3 to the inverter circuit 10 ceases, the three-phase AC motor 2 may make a normal or reverse rotation due to the pressure of the refrigerant inside the compressing mechanism 2b. Such rotation of the three-phase AC motor 2 may produce an induced voltage and thereby cause regeneration in which a current flows through the smoothing capacitor 20 to charge the smoothing capacitor 20 with an increased interelectrode voltage Vin of the smoothing capacitor 20.

As a solution to this, in an example to be described in a fourth embodiment, the discharge control processing for a smoothing capacitor 20 is performed if it is determined that there is a collision of a vehicle as in the third embodiment and that the interelectrode voltage Vin of the smoothing capacitor 20 is increasing.

An in-vehicle power conversion system 1 according to the present embodiment and the in-vehicle power conversion system 1 according to the first embodiment are different from each other in the inverter control processing of the control device 60. Inverter control processing of a control device 60 according to the present embodiment will now be described.

Figure 10:
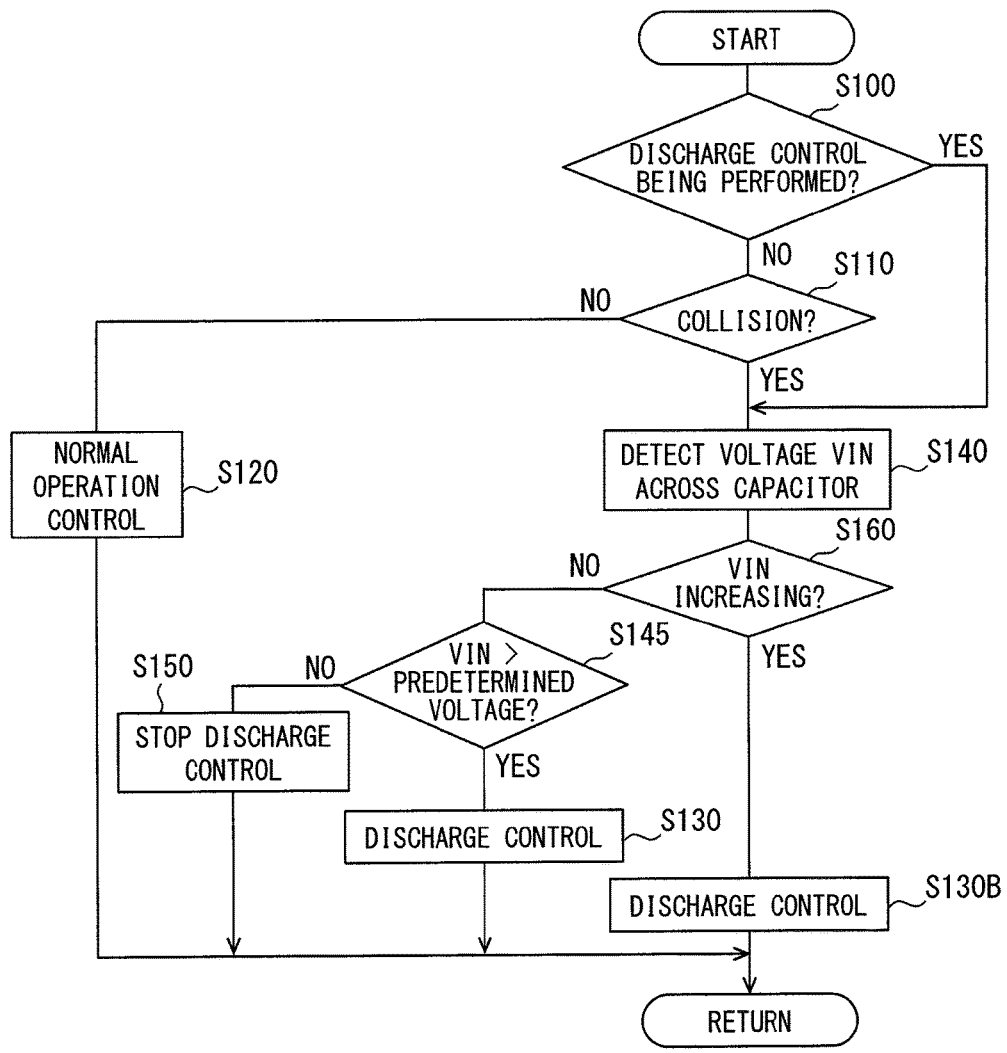
FIG. 10 is a flowchart of inverter control processing of a control device according to a fourth embodiment of the present disclosure.

The control device 60 performs the inverter control processing in accordance with the flowchart in FIG. 9 instead of that in FIG. 10. The flowchart in FIG. 10 includes steps 130B and 160 in addition to those of the flowchart in FIG. 9.

In step 100, if it is determined that the discharge control is not being performed, No is selected. Then, if it is determined in step 110 that there is a collision of a vehicle, Yes is selected. Then, in step 140, a voltage sensor 70 detects the interelectrode voltage Vin of the smoothing capacitor 20.

Then, it is determined in step 160 whether the interelectrode voltage Vin of the smoothing capacitor 20 is increasing on the basis of a value detected by the voltage sensor 70.

Here, an interelectrode voltage Vin of the smoothing capacitor 20 detected by the voltage sensor 70 in step 140 performed for the $n^{th}$ time is referred to as a detected voltage Vin(n). An interelectrode voltage Vin of the smoothing capacitor 20 detected by the voltage sensor 70 in step 140 performed for the $(n-1)^{th}$ time is referred to as a detected voltage Vin(n−1).

For example, after the interruption of the continuity between the smoothing capacitor 20 and a high voltage power source 3 by a relay unit 50, a three-phase AC motor 2 produces electric power due to regeneration because of the pressure of a refrigerant inside a compressing mechanism 2b. If the smoothing capacitor 20 accumulates charge from the power generated due to the regeneration, the detected voltage Vin(n) becomes greater than the detected voltage Vin(n−1). Accordingly, it is determined that the interelectrode voltage Vin of the smoothing capacitor 20 is increasing and thus Yes is selected. Then, in step 130B, the discharge control processing is performed in a similar manner to the discharge control processing in step 130 in FIG. 3.

At this point, a torque that rotates a rotor 84 in the normal direction is generated in the discharge control processing (step 130B) if it is assumed that the rotor 84 is rotated in the reverse direction by the pressure of the refrigerant inside the compressing mechanism 2b upon the interruption of the continuity between a smoothing capacitor 30 and the high voltage power source 3 by a relay unit 50 due to the operation by the electronic control unit 5.

Alternatively, a torque that rotates the rotor 84 in the reverse direction is generated in the discharge control processing (step 130B) if it is assumed that the rotor 84 is rotated in the normal direction by the pressure of the refrigerant inside the compressing mechanism 2b upon the interruption of the continuity between the smoothing capacitor 30 and the high voltage power source 3 by the relay unit 50 due to the operation of the electronic control unit 5.

The normal direction is the direction in which the rotor 84 of the three-phase AC motor 2 is rotated in the normal operation control (step 120). The reverse direction is the direction opposite to the direction in which the rotor 84 of the three-phase AC motor 2 is rotated in the normal operation control (step 120).

As described above, when the electronic control unit 5 causes the relay unit 50 to interrupt the continuity between the smoothing capacitor 30 and the high voltage power source 3, a torque is generated in a direction that prevents the rotor 84 from being rotated by the pressure of the refrigerant inside the compressing mechanism 2b.

Then, the flowchart reverts to step 100, where Yes is selected. Then, in step 140, the voltage sensor 70 detects the interelectrode voltage Vin of the smoothing capacitor 20. The interelectrode voltage Vin of the smoothing capacitor 20 detected at this point is referred to as a voltage Vin(n+1).

Then, if the detected voltage Vin(n+1) is greater than the detected voltage Vin(n), it is determined that the interelectrode voltage Vin of the smoothing capacitor 20 is increasing and Yes is selected. Then, in step 130B, the discharge control processing is performed.

Subsequently, the selection of Yes in step 100, step 140 (the processing to detect the interelectrode voltage Vin), the selection of Yes in step 160, and step 130B (the discharge control processing) are repeated as long as the interelectrode voltage Vin of the smoothing capacitor 20 is increasing. This operation enables the smoothing capacitor 20 to discharge its charge continuously.

Then, in step 140 performed for the $(n+m)^{th}$ time, the voltage sensor 70 detects the interelectrode voltage Vin of the smoothing capacitor 20. The detected voltage detected by the voltage sensor 70 at this point of time is referred to as a detected voltage Vin(n+m). An interelectrode voltage Vin of the smoothing capacitor 20 detected by the voltage sensor 70 in step 140 performed for the $(n+m-1)^{th}$ time is referred to as a detected voltage Vin(n+m−1).

If the detected voltage Vin(n+m) is less than the detected voltage Vin(n+m−1), it is determined that the interelectrode voltage Vin of the smoothing capacitor 20 is decreasing and No is selected in step 160.

Then, in step 145, if the interelectrode voltage Vin of the smoothing capacitor 20 is equal to or greater than a predetermined voltage, Yes is selected. Then, in step 130, the inverter circuit 10 is controlled such that the discharge control processing for the smoothing capacitor 20 is performed.

Subsequently, if the selection of Yes in step 100, step 140 (the processing to detect the interelectrode voltage Vin), and the selection of No in step 160 are followed by the selection of No in step 145, the inverter circuit 10 is controlled in step 150 such that the discharge control processing for the smoothing capacitor 20 is stopped.

In the present embodiment described above, the control device 60 causes, in the event of a collision of a vehicle, the three-phase AC motor 2 to generate a torque in a direction that prevents the rotor 84 from being rotated by the pressure of the refrigerant inside the compressing mechanism 2b if there is a collision of a vehicle and if it is determined that the interelectrode voltage Vin of the smoothing capacitor 20 is increasing due to electric power generated by the three-phase AC motor 2. This allows the charge of the smoothing capacitor 20 to be consumed in abundance in a reduced time, as is the case with the first embodiment. Accordingly, the voltage between the positive electrode and the negative electrode of the smoothing capacitor 20 can be lowered so as to be equal to or less than a predetermined voltage that satisfies a collision safety regulation in a reduced period of time in the event of a collision of the vehicle. Hence, the smoothing capacitor 20 can be discharged in a reduced period of time in the event of a collision of a vehicle.

In the present embodiment, n−1, n, n+1, n+m−1, and n+m each represent a number of times the step is performed.

Other Embodiments

In the first to third embodiments described above, the three-phase AC motor 2 may be caused to generate a torque in a direction that prevents the rotor 84 from being rotated by the pressure of the refrigerant inside the compressing mechanism 2b in the event of a collision of the vehicle, as is the case with the fourth embodiment.

In each of the examples described in the first to fourth embodiments, the electric motor of the present disclosure is the three-phase AC motor 2. Alternatively, an n(≠3)-phase AC motor may be used as the electric motor of the present disclosure. Here, n is an integer that satisfies n=2 or n>4.

In each of the examples described in the first to fourth embodiments, the electric motor of the present disclosure is a synchronous AC motor. Alternatively, an induction AC motor may be used as the electric motor of the present disclosure.

In each of the examples described in the first to fourth embodiments, it is determined that there is an anomaly of a vehicle and Yes is selected in step 110 if there is a collision of the vehicle. Alternatively, it may be determined that there is an anomaly of the vehicle and Yes may be selected in step 110 if another abnormal condition, instead of a collision of the vehicle, occurs.

In each of the examples described in the first to fourth embodiments, the electric motor of the present disclosure is included in an electric compressor. Alternatively, the electric motor of the present disclosure may constitute an auxiliary machine for an electric water pump, a fan for use in an air conditioner, or the like. The auxiliary machine has a function unrelated to driving, braking, or steering of a vehicle and can be caused to generate a torque after a collision of the vehicle for the safety of the vehicle.

A DC power source corresponds to the high voltage power source 3, an electric motor corresponds to the three-phase AC motor 2, and a drive circuit corresponds to the inverter circuit 10. A capacitor corresponds to the smoothing capacitor 20, a relay switch corresponds to the relay unit 50, and an anomaly determining device corresponds to step 110. A discharge control device corresponds to step 130, a current detecting device corresponds to the current sensor 71, and a voltage detecting device corresponds to the voltage sensor 70. A first voltage determining device corresponds to step 145, a second voltage determining device corresponds to step 160, and switching elements correspond to the transistors SW1, SW2, SW3, SW4, SW5, and SW6.

It is noted that a flowchart or the processing of the flowchart in the present application includes sections (also referred to as steps), each of which is represented, for instance, as S100. Further, each section can be divided into several sub-sections while several sections can be combined into a single section. Furthermore, each of thus configured sections can be also referred to as a device, module, or means.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for an in-vehicle electric motor controlling a drive circuit that drives the in-vehicle electric motor based on an output voltage of a DC power source, wherein: a capacitor for stabilizing the output voltage output from the DC power source to the drive circuit is disposed between the DC power source and the drive circuit; and a relay switch for connecting or disconnecting between the DC power source and the capacitor is disposed between the DC power source and the capacitor, the control device comprising:

an anomaly determining device that determines whether an anomaly occurs in a vehicle;

a discharge control device that controls the drive circuit to generate a torque at the electric motor based on an output voltage of the capacitor in a state where the relay switch disconnects between the DC power source and the capacitor when the anomaly determining device determines that the anomaly occurs in the vehicle, the electric motor including a stator coil that generates a magnetic field according to an output current from the drive circuit and a rotor that rotates according to the magnetic field generated by the stator coil; and an estimating device that estimates a position of the rotor when the anomaly determining device determines that the anomaly occurs in the vehicle;

wherein the discharge control device controls the drive circuit to generate the magnetic field at the stator coil for generating the torque that rotates the rotor by a predetermined angle from the position of the rotor estimated by the estimating device in a state where the relay switch disconnects between the DC power source and the capacitor when the anomaly determining device determines that the anomaly occurs in the vehicle.

2. The control device for an in-vehicle electric motor according to claim 1, wherein:

the discharge control device controls the drive circuit to generate the torque for rotating the rotor with a predetermined number of revolutions by generating a rotating magnetic field as the magnetic field at the stator coil in the state where the relay switch disconnects between the DC power source and the capacitor when the anomaly determining device determines that the anomaly occurs in the vehicle.

3. The control device for an in-vehicle electric motor according to claim 1, wherein:

the estimating device estimates the position of the rotor based on a detection value detected by a current detecting device that detects the output current output from the drive circuit to the stator coil when the anomaly determining device determines that the anomaly occurs in the vehicle.

4. The control device for an in-vehicle electric motor according to claim 2, wherein:

the drive circuit is an inverter circuit that includes a pair of switching elements connected in series and arranged at each phase of the electric motor, and pairs of switching elements are connected in parallel between a positive bus and a negative bus; and the discharge control device switches each pair of switching elements at respective phases to generate the magnetic field at the stator coil by outputting an alternating current from the inverter circuit to the stator coil based on the output voltage of the capacitor.

5. The control device for an in-vehicle electric motor according to claim 1, further comprising:

a first voltage determining device that determines, based on a detection value detected by a voltage detecting device that detects a voltage between a positive electrode and a negative electrode of the capacitor, whether the voltage between the positive electrode and the negative electrode of the capacitor is equal to or greater than a predetermined voltage, wherein:

the discharge control device controls the drive circuit in a state where the relay switch disconnects between the DC power source and the capacitor when the anomaly determining device determines that the anomaly occurs in the vehicle and the first voltage determining device determines that the voltage between the positive electrode and the negative electrode of the capacitor is equal to or greater than the predetermined voltage.

6. The control device for an in-vehicle electric motor according to claim 1, further comprising:

a second voltage determining device that determines, based on a detection value detected by a voltage detecting device that detects a voltage between a positive electrode and a negative electrode of the capacitor, whether the voltage between the positive electrode and the negative electrode of the capacitor increases, wherein:

the discharge control device controls the drive circuit in a state where the relay switch disconnects between the DC power source and the capacitor when the anomaly determining device determines that the anomaly occurs in the vehicle and the second voltage determining device determines that the voltage between the positive electrode and the negative electrode of the capacitor increases.

7. The control device for an in-vehicle electric motor according to claim 1, wherein:

the electric motor drives a compression mechanism that compresses a refrigerant.

8. The control device for an in-vehicle electric motor according to claim 1, wherein the predetermined angle is π/3.

9. The control device for an in-vehicle electric motor according to claim 1, wherein the control device is further configured to detect a current of the electric motor and select a switching pattern based on the estimated position of the rotor, and the discharge control device uses the switching pattern to operate switches of the drive circuit to generate the magnetic field at the stator coil to generate torque that rotates the rotor by the predetermined angle from the estimated position of the rotor.

10. A control device for an in-vehicle electric motor controlling a drive circuit that drives the in-vehicle electric motor based on an output voltage of a DC power source, with a capacitor that stabilizes the output voltage from the DC power source to the drive circuit being disposed between the DC power source and the drive circuit and with a relay switch that connects and disconnects the DC power source from the capacitor being disposed between the DC power source and the capacitor, the control device being configured to:

determine whether an anomaly occurs in a vehicle corresponding to the in-vehicle electric motor;

control the drive circuit to generate a torque at the in-vehicle electric motor based on an output voltage of the capacitor in response to the relay switch disconnecting the DC power source from the capacitor when the control device determines that the anomaly occurs in the vehicle, the in-vehicle electric motor including a stator coil that generates a magnetic field according to an output current from the drive circuit and a rotor that rotates according to the magnetic field generated by the stator coil;

estimate a position of the rotor when the control device determines that the anomaly occurs in the vehicle; and in response to determining that the anomaly occurs and to the relay switch disconnecting the DC power source from the capacitor, control the drive circuit to generate the magnetic field at the stator coil to generate torque that rotates the rotor by a predetermined angle from the estimated position of the rotor.

11. The control device for an in-vehicle electric motor according to claim 10, wherein the predetermined angle is π/3.

12. The control device for an in-vehicle electric motor according to claim 8, wherein the control device is further configured to detect a current of the electric motor and select a switching pattern based on the estimated position of the rotor, the control device using the switching pattern to operate switches of the drive circuit to generate the magnetic field at the stator coil to generate torque that rotates the rotor by the predetermined angle from the estimated position of the rotor.

* * * * *